United States Patent
Tanbakuchi (10) Patent No.: US 7,031,558 B2
(45) Date of Patent: Apr. 18, 2006

(54) LOW-PASS FILTER TRANSMISSION LINE WITH INTEGRAL ELECTROABSORPTION MODULATOR

(76) Inventor: Hassan Tanbakuchi, 4825 Pressley Rd., Santa Rosa, CA (US) 95404

( * ) Notice: Subject to any disclaimer, the term of this patent is extended or adjusted under 35 U.S.C. 154(b) by 130 days.

(21) Appl. No.: 10/642,931

(22) Filed: Aug. 18, 2003

(65) Prior Publication Data

US 2005/0058385 A1   Mar. 17, 2005

(51) Int. Cl.
    G02F 1/01       (2006.01)
(52) U.S. Cl. ............ 385/1; 385/2; 385/8; 359/254
(58) Field of Classification Search ............ 385/1, 385/2, 8, 40; 359/254
    See application file for complete search history.

(56) References Cited

U.S. PATENT DOCUMENTS

| | | | |
|---|---|---|---|
| 4,479,100 A | 10/1984 | Moghe et al. | |
| 5,208,697 A | 5/1993 | Schaffner et al. | |
| 5,291,565 A | 3/1994 | Schaffner et al. | |
| 5,546,218 A | 8/1996 | Komatsubara et al. | |
| 5,671,302 A | 9/1997 | Skeie | |
| 5,675,673 A | 10/1997 | Skeie | |
| 5,696,855 A | 12/1997 | Skeie | |
| 5,729,378 A | 3/1998 | Tanaka et al. | |
| 5,793,516 A * | 8/1998 | Mayer et al. | 359/245 |
| 5,854,862 A | 12/1998 | Skeie | |
| 6,057,954 A * | 5/2000 | Parayanthal et al. | 359/248 |
| 6,204,924 B1 | 3/2001 | Cyr | |
| 6,392,781 B1 | 5/2002 | Kim et al. | |
| 6,590,691 B1 * | 7/2003 | Nagra et al. | 359/237 |
| 6,677,830 B1 * | 1/2004 | Miller et al. | 333/33 |
| 2003/0007228 A1 | 1/2003 | Shirai | |
| 2003/0138179 A1 * | 7/2003 | Akiyama et al. | 385/2 |
| 2003/0147574 A1 | 8/2003 | Lam et al. | |
| 2004/0001242 A1 * | 1/2004 | Shigeta et al. | 359/240 |
| 2004/0032646 A1 * | 2/2004 | Koren et al. | 359/344 |

FOREIGN PATENT DOCUMENTS

| | | |
|---|---|---|
| EP | 0 553 460 | 12/1992 |
| EP | 1 207 377 | 11/2001 |
| WO | WO 01/06286 | 1/2001 |

OTHER PUBLICATIONS

R. Lewen et al., "Ultra high-speed segmented traveling-wave electroabsorption modulators," OFC 2003, post deadline paper PD38, Mar. 2003.

T.R. Ranganath, "40 Gb/s Components," OFC 2002, pp. 336-338 (Mar. 2002).

(Continued)

*Primary Examiner*—Leonidas Boutsikaris (57) ABSTRACT

A low-pass filter transmission line with an integral electroabsorption modulator is described. In one aspect, the electroabsorption modulator functions as an element of a distributed low-pass filter transmission line circuit that is impedance-matched to a target source impedance. In this way, the electrical voltage that is delivered across the electro-absorption modulator may be optimized because the electrical losses do not occur in the low-pass filter transmission line circuit, but rather substantially all incident power is absorbed in a downstream matched termination load. In another aspect, the electro-absorption modulator has a signal electrode with a segmented traveling wave structure that provides substantially the same modulation performance as a similar un-segmented signal electrode of comparable effective length, but is characterized by a substantially higher bandwidth.

13 Claims, 4 Drawing Sheets

OTHER PUBLICATIONS

Hsu-Feng Chou et al., "40 Ghz Optical pulse generation using traveling-wave electroabsorption modulator," OFC 2002, pp. 338-339 (Mar. 2002).

A. Shen et al., "Low insertion loss and polarization-insensitive InP-based Mach-Zehnder modulator for 40 Gbit/s optical regeneration," OFC 2002, pp. 339-340 (Mar. 2002).

Hao Feng et al., "40 Gb/s Electro-absorption-modualtor-integrated DFB laser with Optimized design," OFC 2002, pp. 340-341 (Mar. 2002).

G. I. Li et al., "Ultrahigh-speed traveling-wave electroabsorption modulator—design and analysis," IEEE Trans. on Microwave Theory and Techniques, vol. 47, No. 7, pp. 1177-1183, Jul. 1999.

D. M. Pozar, "Microwave Engineering," 2d Edition, Wiley, pp. 56, 162, 470-473 (1998).

R. Lewen et al., "Microwave CAD Circuit Modeling of a Traveling-Wave Electroabsorption Modulator," IEEE Trans. on Microwave Theory and Techniques, vol. 51, No. 4, pp. 1117-1128 Apr., 2003.

\* cited by examiner

Freq(1 GHz to 40 GHz)

Freq(1 GHz to 140 GHz)

LOW-PASS FILTER TRANSMISSION LINE WITH INTEGRAL ELECTROABSORPTION MODULATOR

BACKGROUND

Two general approaches typically are used to intensity-modulate light: direct modulation and external modulation.

In a direct modulation approach, a laser (e.g., a laser diode) is directly modulated by an information signal to generate a modulated laser output. The laser output power often is modulated directly by modulating the input drive current to the laser. The laser begins lasing when the drive current exceeds a threshold current level. Typically, the modulation range of input drive current that is applied to a directly modulated laser extends above and below the threshold current level.

In an external modulation approach, a modulator modulates the intensity of light generated by a continuous wave laser in accordance with an information signal. The modulator and laser may be disposed on separate, discrete substrates or they may be fabricated together on a single substrate. External modulators fall into two main families: electro-optic type modulators, such as Mach-Zehnder type electro-optic modulators, which modulate light through destructive interference; and electro-absorption modulators, which modulate light by absorption (e.g., through the Quantum Confined Stark effect). The absorption depth (i.e., the extinction ratio) and the spectrum of an electro-absorption modulator depends on the drive voltage across the modulator. An external modulator typically is positioned to receive the output of a continuous wave laser and the voltage across the modulator is varied to produce a digital optical bit stream.

In an external optical modulator, a time-varying electric signal modulates the input optical signal. Lump-type (e.g., electro-absorptive) external optical modulators typically are limited at high frequencies by their total capacitance. Typical high-speed external optical modulators avoid such a limitation by using a traveling-wave electrode structure, which includes a transmission line signal electrode located near an optical waveguide carrying the input optical signal. In a traveling wave optical modulator (e.g., a Mach-Zender interferometer), the optical modulation is dominated by the distributed interaction between the time-varying input electrical signal and an optical signal over the length of the optical modulator. Ideally, the input electrical signal and the input optical signal propagate with substantially the same phase velocities through a traveling wave optical modulator so that each portion of the optical signal interacts with substantially the same portion of the applied electrical signal as it propagates through the modulator.

In addition to matching optical and electrical phase velocities, it is desirable to reduce electrical losses as the input electrical signal travels through a traveling wave optical modulator. To this end, it is desirable to match the characteristic impedance of the optical modulator to the impedance of the source of the input electrical signal to reduce reflections and increase the electrical voltage delivered across the optical modulator. The geometry of the input signal electrode may be tailored to match optical and electrical phase velocities, to match the characteristic impedance of the modulator to the source impedance, or to reduce electrical losses along the signal electrode arising from impedance mismatch between the source impedance and the modulator. Typical electrode geometry parameters that are varied to achieve the desired electrical parameters include the thickness of the electrode, the width of the electrode, and the spacing between the top electrode and the side ground electrode (if present).

SUMMARY

The invention features a low-pass filter transmission line with an integral electro-absorption modulator. In one aspect, the electro-absorption modulator functions as an element of a distributed low-pass filter transmission line circuit that is impedance-matched to a target source impedance. In this way, the invention allows the electrical voltage that is delivered across the electro-absorption modulator to be optimized because the electrical losses arising from impedance mismatch between the source impedance and the modulator do not occur in the matched low-pass filter transmission line circuit, but rather substantially all incident power available from the source travels through the low-pass filter transmission line circuit to a downstream matched termination load, where the incident power is absorbed. In another aspect, the electro-absorption modulator has a signal electrode with a segmented traveling wave structure that provides substantially the same modulation performance as a similar un-segmented signal electrode of comparable effective length, but is characterized by a substantially higher bandwidth.

In one aspect, the invention features a device that includes an input microstrip line, an output microstrip line, and an electro-absorption modulator. The input and output microstrip lines each respectively has a length less than one-quarter of a target wavelength corresponding to a target operating frequency, a characteristic impedance greater than a target source impedance, and a series inductance at the target operating frequency. The electro-absorption modulator has a signal electrode with a length less than one-quarter of the target wavelength, a characteristic impedance less than the target source impedance, and a shunt capacitance at the target operating frequency. The input microstrip line, output microstrip line, and the electro-absorption modulator are incorporated into a distributed low-pass filter transmission line circuit having a characteristic impedance substantially matching the target source impedance at the target operating frequency.

In another aspect, the invention features a device that includes an electro-absorption modulator having a signal electrode with a distributed traveling wave structure that includes multiple spaced-apart signal electrode segments connected in series with each pair of signal electrode segments connected by a respective microstrip line.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
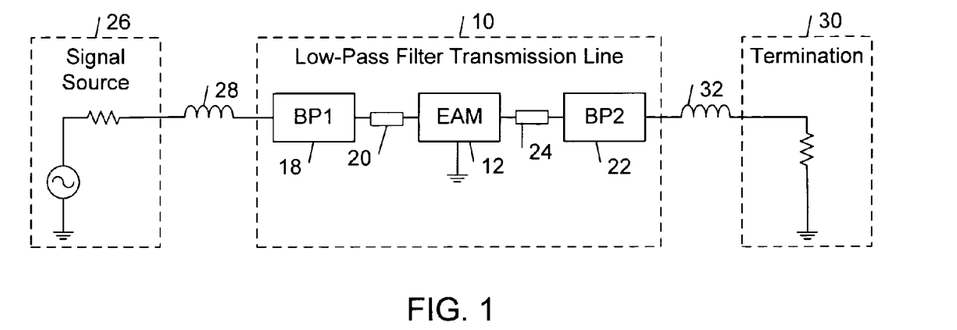
FIG. 1 is a block diagram of a low-pass filter transmission line with an integral electro-absorption modulator connected between an external signal source and an external termination load.

Referring to FIG. 1, in some embodiments, a low-pass filter transmission line 10 includes an electro-absorption modulator (EAM) 12, an input bonding pad (BP1) 18 connected to an input of the electro-absorption modulator 12 by a microstrip line 20, and an output bonding pad (BP2) 22 connected to an output of the electro-absorption modulator 12 by a microstrip line 24. The input bonding pad 18 is connected to an external signal source 26 by a bonding wire 28. The output bonding pad 22 is connected to an external termination load 30 through a bonding wire 32.

The electro-absorption modulator 12 may be implemented in the form of any type of electro-absorption modulator. The electro-absorption modulator 12, the input and output bonding pads 18, 22, and the input and output microstrip lines 20, 24 are fabricated on the same substrate (e.g., a semiconductor wafer substrate).

The external signal source 26 may be any suitable high-frequency electrical signal source, including any RF (Radio Frequency) electrical source. The external termination load 30 may be any suitable termination load, such as a resistor. Termination load 30 and signal source 26 typically are impedance-matched to reduce reflections and maximize the electrical voltage that can be delivered across the electro-absorption modulator 12.

As explained in detail below, the electro-absorption modulator 12, the input and output bonding pads 18, 22, and the input and output microstrip lines 20, 24 are designed to operate cooperatively as a distributed low-pass filter transmission line circuit that is impedance-matched to the signal source 26 to optimize the electrical voltage that is delivered across the electro-absorption modulator 12.

Figure 2:
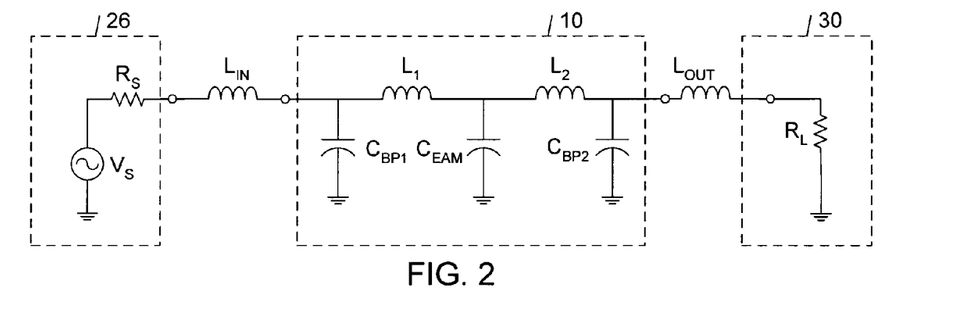
FIG. 2 is a circuit diagram of a model of the signal source, the low-pass filter transmission line, and the termination load of FIG. 1.

FIG. 2 shows an equivalent circuit of the transmission line system of FIG. 1. The signal source 26 is modeled by a voltage source $V_S$ and a series resistance $R_S$ (or target source impedance), which has a value of 50 ohms in some implementations. The termination load 30 is modeled by a termination resistance $R_L$. The components of the low-pass filter transmission line 10 are designed so that the electro-absorption modulator 12 and the input and output bonding pads 18, 22 are capacitive and the input and output microstrip lines 20, 24 are inductive for frequencies up to at least a target operating frequency (e.g., from DC to 33 GHz for a 40 Gbit NRZ optical data stream in some implementations). The target operating frequency corresponds to the highest electrical signal frequency specified for a product incorporating the low-pass filter transmission line 10. In general, the low-pass filter transmission line 10 should satisfy certain specified (low) loss and (minimal) group delay requirements when operating at a frequency up to and including the target operating frequency. The specified electrical signal frequency typically varies depending on the target application or target market for the product incorporating low-pass transmission line 10.

The signal electrode of the electro-absorption modulator 12 has a length that is less than one-quarter of the wavelength corresponding to the target operating frequency and a characteristic impedance that is less than the target source impedance. Similarly, the input and output bonding pads 18, 24 have respective sizes that are sufficient for bonding while having respective lengths that are less than one-quarter of the wavelength corresponding to the target operating frequency and respective characteristic impedances that are less than the target source impedance.

The input and output microstrip lines 20, 24 have respective lengths that are less than one-quarter of the wavelength corresponding to the target operating frequency and respective characteristic impedances that are greater than the target source impedance. Microstrip lines 20, 24 help compensate for the low impedance values of the EAM 12 and the bonding pads 18, 24 to provide a transmission line circuit that is substantially impedance-matched to signal source 26. In the equivalent circuit of FIG. 2, the electro-absorption modulator 12 is represented as a shunt capacitor $C_{EAM}$, the input and output bonding pads 18, 22 are modeled by shunt capacitors $C_{BP1}$, $C_{BP2}$, and the input and output microstrip lines 20, 24 are represented as series inductors $L_1$, $L_2$.

The impedance, capacitance, and inductance values for the components of transmission line 10 are selected to achieve an overall characteristic impedance that substantially matches the target source impedance at frequencies up to at least the target operating frequency. These electrical parameter values may be selected, for example, by selecting appropriate values for the widths of the signal electrode, the bonding pads 18, 22, and the microstrip lines 20, 24, and by selecting appropriate values for the thickness of the underlying dielectric material. These values may be determined using an electromagnetic simulation tool (e.g., the HFSS™ electromagnetic simulation software tool, available from Ansoft Corporation of Pittsburgh, Pa., U.S.A.). The electrical parameter values of the components of transmission line 10 may be selected in accordance with any type of low-pass filter design (e.g., a Chebyshev-type of low-pass filter).

Figures 3A, 3B:
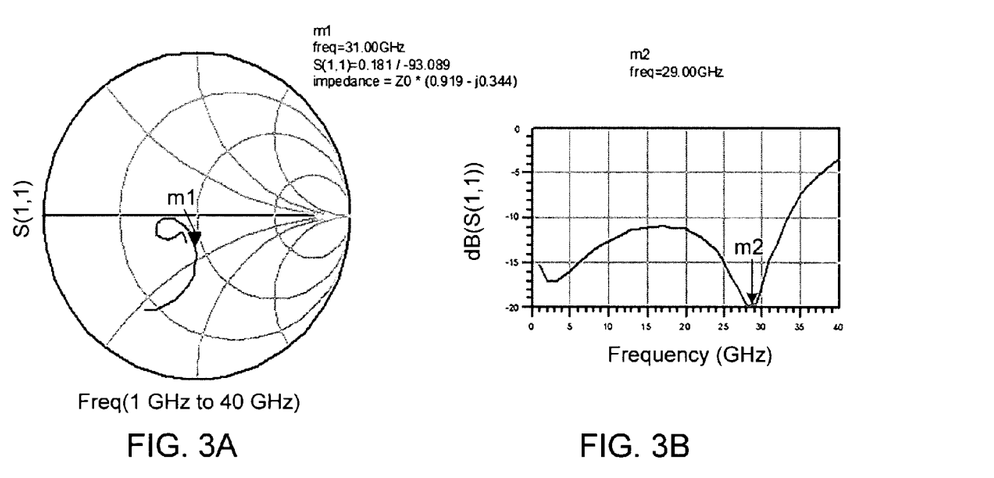
FIG. 3A is a Smith Chart showing the change in the impedance of an exemplary implementation of the low-pass filter transmission line of FIG. 1 over a frequency range of 1 GHz to 40 GHz.
FIG. 3B is a graph of return loss for an exemplary implementation of the low-pass filter transmission line of FIG. 1 plotted as a function of frequency over a frequency range of 1 GHz to 40 GHz.

FIGS. 3A and 3B show the simulated transmission line behavior of an exemplary implementation of low-pass filter transmission line 10 over a frequency range of 1 GHz to 40 GHz. The Smith Chart of FIG. 3A shows that the transmission line 10 is substantially impedance-matched to the source throughout much of the simulated frequency range, where the marker M1 points to the impedance at a frequency of 31 GHz. Similarly, the return loss plot of FIG. 3B shows that the return loss (i.e., the ratio of the amplitude of the reflected wave to the amplitude of the incident wave at the junction of transmission line 10 and termination load 30) for transmission line 10 is substantially low throughout much of the simulated frequency range, where the marker M2 points to a minimum in the return loss at a frequency of 29 GHz.

Figure 4A:
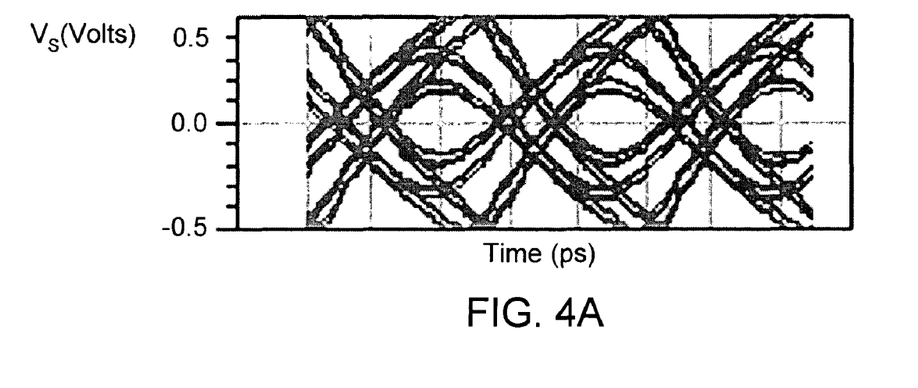
FIG. 4A is an eye diagram for an unmatched implementation of the low-pass filter transmission line of FIG. 1.
Figure 4B:
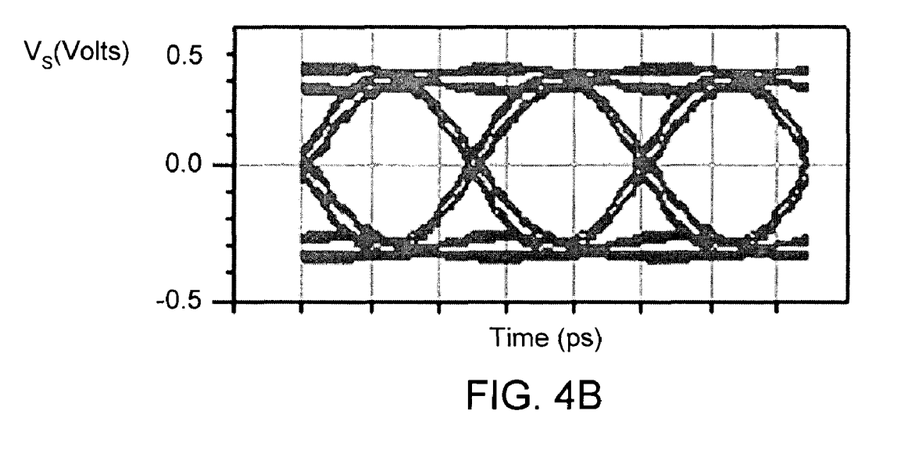
FIG. 4B is an eye diagram for a matched implementation of the low-pass filter transmission line of FIG. 1.
Figure 4C:
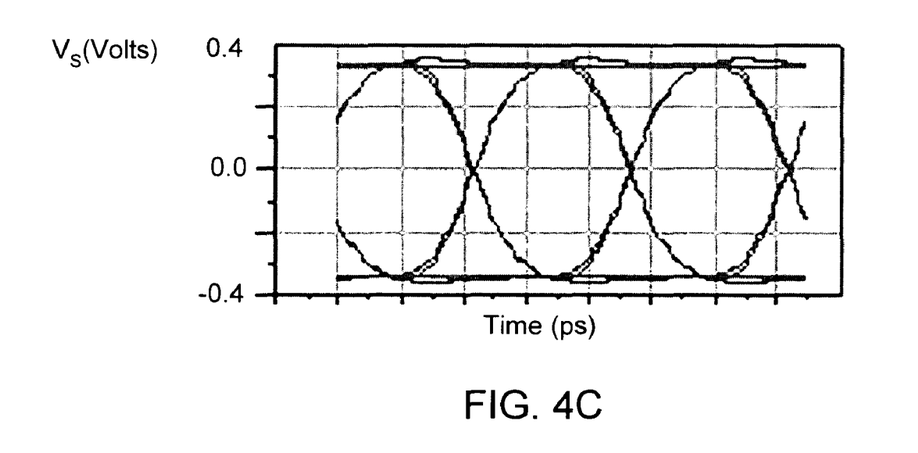
FIG. 4C is an eye diagram for a reference impedance-matched transmission line circuit.

FIGS. 4A and 4B shows how the eye diagram for the low-pass filter transmission line 10 improves dramatically from a substantially closed eye diagram for an EAM signal electrode implementation that is connected directly to a signal source without the matching network shown in FIG. 1 (i.e., the EAM signal electrode is not impedance-matched to the signal source 26) to a substantially open eye diagram for an impedance-matched implementation (FIG. 4B). The wide openings and crisp transitions between the −0.5, 0.0, and 0.5 states in the eye diagram of FIG. 4B characterize a substantially matched transmission line that is likely to deliver optimum throughput performance for a low bit-error rate (BER) optical data stream. Conversely, the eye pattern of FIG. 4A shows an EAM optical data stream with a throughput that is affected by jitter, noise, and reduced signal amplitude. FIG. 4C shows an eye diagram for a reference circuit consisting of only signal source 26 and an impedance-matched termination load 30.

Figure 5:
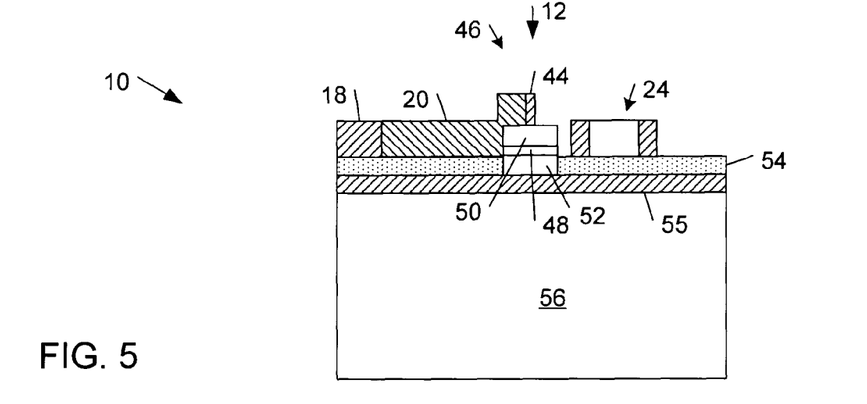
FIG. 5 is a diagrammatic side view of an implementation of the low-pass filter transmission line of FIG. 1.

Referring to FIG. 5, in some embodiments, low-pass filter transmission line 10 is implemented with an integral ridge-type of electro-absorption modulator 12 that includes a signal electrode 44 that is formed on a ridge structure 46. In some implementations, an optically transparent intrinsic semiconductor region 48 serves as an optical waveguide that is sandwiched between a p-type cladding semiconductor layer 50 and an n-type cladding semiconductor layer 52. In some implementations, the intrinsic semiconductor region 48 has a thickness on the order of about 0.3 µm. A p+-type cap (or contact) layer may be interposed between the p-type cladding layer 50 and the signal electrode 44. The intrinsic semiconductor region 48 may include a multiple quantum well (MQW) structure. In some embodiments, the ridge structure 46 is formed on an electrically conducting layer 55, which is formed on a substrate 56. Substrate 56 may be electrically conducting (e.g., an n+ doped InP substrate) or electrically insulating. The transmission lines 20, 24 are formed on an electrically insulating layer 54 that, in turn, is formed on electrically conducting layer 55. In other embodiments, the substrate 56 is electrically conducting, the EAM is formed on the electrically conducting substrate, and the transmission lines 20, 24 are formed on an electrically insulating layer that is formed on the electrically conducting substrate. In operation, the p-i-n junction formed by regions 50, 48, 52 is reverse biased to modulate the intensity of an optical signal traveling through the intrinsic semiconductor region 48 by varying the optical absorption threshold in the intrinsic semiconductor region 48.

Figure 6A:
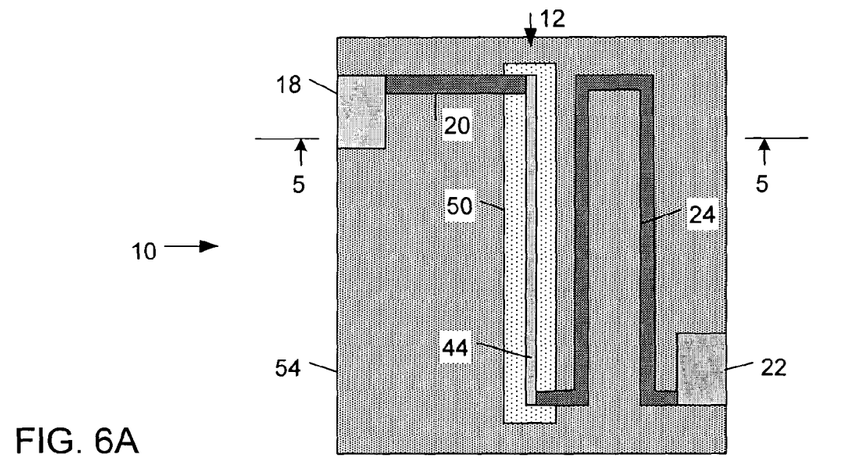
FIGS. 6A and 6B are, respectively, diagrammatic top views of the low-pass filter transmission line of FIG. 5 with different electro-absorption modulator signal electrode implementations.

FIG. 6A shows an implementation of the low-pass filter transmission line 10 in which the signal electrode 44 is a continuous strip of electrically conductive material (e.g., gold, copper, or aluminum). The input and output bonding pads 18, 22 and the input and output microstrip lines 20, 24 also are implemented by respective strips of electrically conductive material (e.g., gold, copper, or aluminum). In one exemplary implementation designed to match the low-pass filter transmission line 10 to a 50-ohm target source impedance, the electrically conductive traces forming the signal electrode 44, the input and output bonding pads 18, 22, and the input and output microstrip lines 20, 24 have the following width and length dimensions:

TABLE 1

| COMPONENT | WIDTH (µm) | LENGTH (µm) |
| --- | --- | --- |
| Signal Electrode 44 | 1.5 | 150 |
| Input Bonding Pad 18 | 40 | 40 |
| Output Bonding Pad 22 | 75(75) | 200(50) |
| Input Microstrip Line 20 | 6 | 80 |
| Output Microstrip Line 24 | 3 | 600 |

The numbers in parentheses in the WIDTH and LENGTH columns in the Output Bonding Pad 22 row of TABLE 1 refer to the width and length dimensions of a second shunt (or tap) capacitor connected in parallel with the output bonding pad 22. The second shunt capacitor is described in detail below in connection with FIGS. 8A and 8B.

Figure 6B:
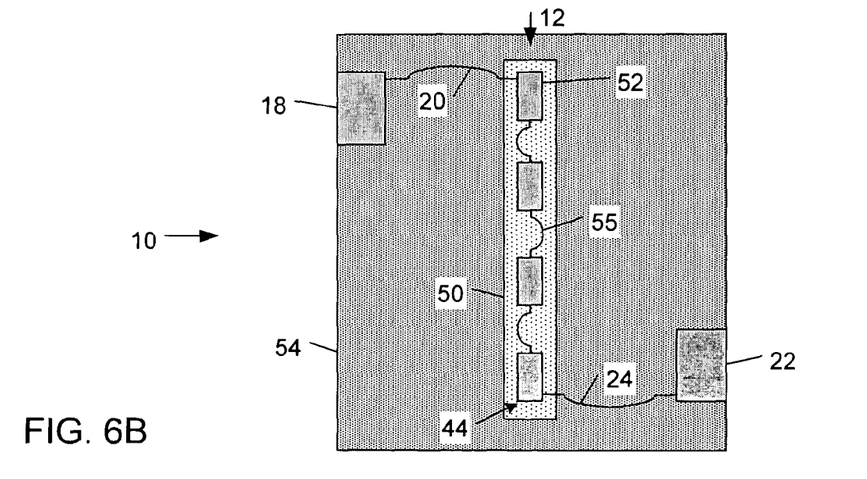

FIG. 6B shows an implementation of the low-pass filter transmission line 10 in which the signal electrode 44 has a distributed traveling wave structure that includes multiple spaced-apart electrode segments 52 of electrically conductive material (e.g., gold, copper, or aluminum) connected in series, with each pair of signal electrode segments connected by a respective inter-stage microstrip line 55. The input and output bonding pads 18, 22 and the input and output microstrip lines 20, 24 also are implemented by respective strips of electrically conductive material (e.g., gold, copper, or aluminum). The signal electrode segments 52 are formed on respective electrically conducting regions of p-type layer 50. These electrically conducting regions of p-type layer 50 are electrically isolated from each other by electrically insulating regions to achieve the distributed traveling wave structure of signal electrode 44. In some embodiments, the electrically insulating regions of p-type layer 50 are formed by leaving these regions un-doped (i.e., intrinsic) and, thereby, substantially electrically insulating.

In one exemplary implementation designed to match the low-pass filter transmission line 10 to a 50-ohm target source impedance, the signal electrode segments 52 are 50 µm long and are spaced-apart by 50 µm and the electrically conductive traces forming the signal electrode segments 52, the input and output bonding pads 18, 22, and the input and output microstrip lines 20, 24, and the three inter-stage microstrip lines 55 have the following width and length dimensions:

TABLE 2

| COMPONENT | WIDTH (µm) | LENGTH (µm) |
| --- | --- | --- |
| Signal Electrode Segment 52 | 10 | 50 |
| Input Bonding Pad 18 | 30 | 30 |
| Output Bonding Pad 22 | 30 | 30 |
| Input/Output Microstrip Lines 20, 24 | 10 | 100 |
| Inter-stage Microstrip Lines 55 | 10 | 150 |

In the implementation of FIG. 6B, each segment 52 of signal electrode 44 may be made shorter than a similar un-segmented signal electrode of comparable effective length. Such shorter segmented signal electrode lengths would reach the one-quarter wavelength threshold (at which point they become inductive) at a higher operating frequency than the comparable un-segmented signal electrode. In this way, the signal electrode segments 52 may be arranged in a traveling wave electrode structure that provides substantially the same modulation performance as a similar un-segmented signal electrode with a comparable effective length, but is characterized by a substantially higher bandwidth (e.g., up to 200 GHz or higher) because the lower capacitance allows the segmented electrode structure to operate at higher frequencies relative to the un-segmented electrode structure, while providing comparable extinction ratio performance.

Figure 7A:
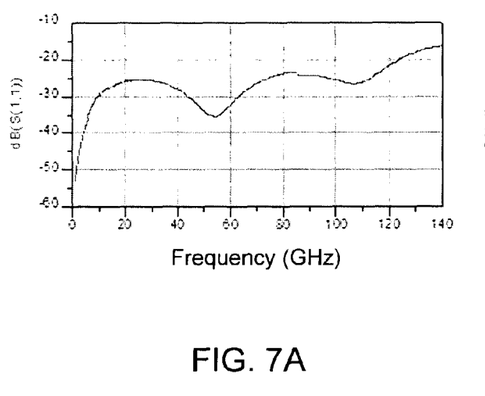
FIG. 7A is a graph of return loss for an implementation of the electro-absorption modulator embodiment of FIG. 6B.
Figure 7B:
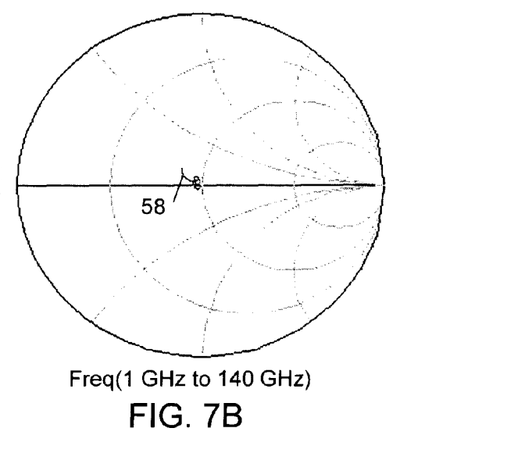
FIG. 7B is a Smith Chart showing the change in the impedance of an exemplary implementation of the low-pass filter transmission line of FIG. 6B over a frequency range of 1 GHz to 140 GHz.
Figure 7C:
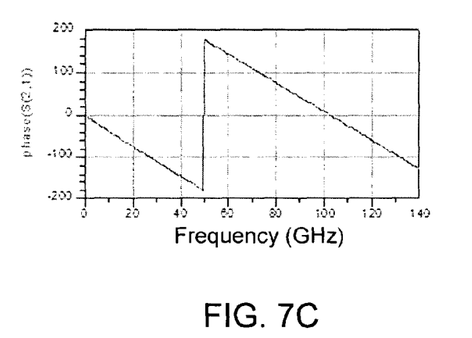
FIG. 7C is a graph of phase angle of the forward transmission coefficient for of an exemplary implementation of the low-pass filter transmission line of FIG. 6B over a frequency range of 1 GHz to 140 GHz.
Figure 7D:
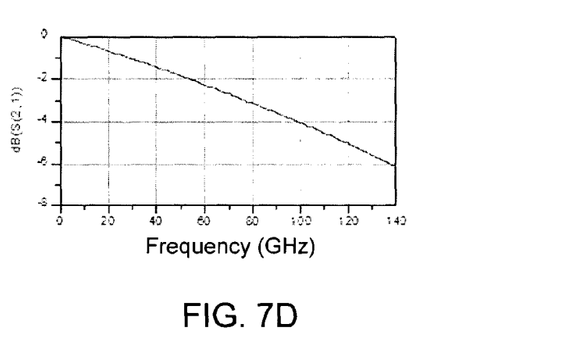
FIG. 7D is a graph of magnitude of the forward transmission coefficient for of an exemplary implementation of the low-pass filter transmission line of FIG. 6B over a frequency range of 1 GHz to 140 GHz.

FIGS. 7A–7D show the simulated transmission line behavior of an exemplary implementation of the embodiment of FIG. 6B that is optimized for a target operating frequency of 140 GHz. FIG. 7A is a graph of return loss for an implementation of the electro-absorption modulator embodiment of FIG. 6B. FIG. 7B is a Smith Chart showing the change in the impedance 58 of an exemplary implementation of the low-pass filter transmission line of FIG. 6B over a frequency range of 1 GHz to 140 GHz. The Smith Chart of FIG. 7B shows that the segmented signal electrode transmission line structure is substantially impedance-matched to the source throughout much of the simulated frequency range. FIG. 7C is a graph of phase angle of the forward transmission coefficient for of an exemplary implementation of the low-pass filter transmission line of FIG. 6B over a frequency range of 1 GHz to 140 GHz. FIG. 7D is a graph of magnitude of the forward transmission coefficient for of an exemplary implementation of the low-pass filter transmission line of FIG. 6B over a frequency range of 1 GHz to 140 GHz.

Figure 8A:
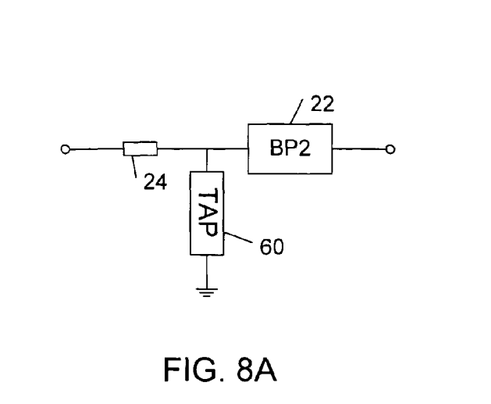
FIGS. 8A and 8B are, respectively, a block diagram and a circuit diagram of an implementation of the output of the low-pass filter transmission line of FIG. 1.
Figure 8B:
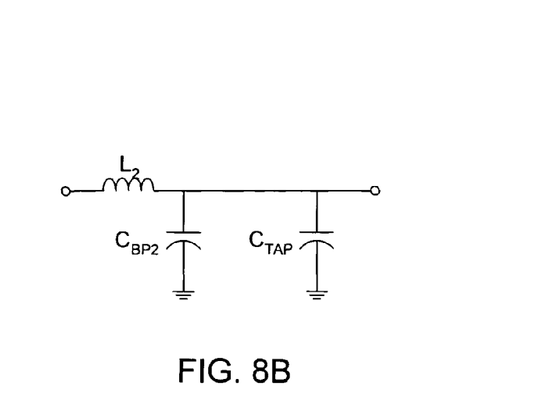

FIGS. 8A and 8B shows an embodiment of the low-pass filter transmission line output 16 that may be used to compensate for the larger capacitance of the un-segmented signal electrode 44. In this embodiment, a second shunt (or tap) capacitor 60 ($C_{TAP}$) is connected in parallel with bonding pad 22. The lengths of bonding pad 22 and shunt capacitor 60 may be made less than one-quarter of the target wavelength so that they remain capacitive up to relatively high target operating frequencies, while still achieving the total effective capacitance needed to achieve the desired low-pass filter transmission line design. By contrast, in implementations in which output 16 includes only a series-connected bonding pad 22, the length of bonding pad 22 that is required to achieve the same output capacitance is larger than the lengths of either output capacitor in the embodiment of FIGS. 8A and 8B. Such an increased length limits the operating bandwidth of the low-pass filter transmission line 10 because the longer length would reach the one-quarter wavelength threshold (at which point it becomes inductive) at a lower operating frequency than either the parallel-connected bonding pad or the shunt capacitor 60 in the embodiment of FIGS. 8A and 8B.

The transmission line output embodiment of FIGS. 8A and 8B also may be incorporated in a low-pass filter transmission line that incorporates the segmented electrode EAM of FIG. 6B.

Other embodiments are within the scope of the claims.

What is claimed is:

1. A device, comprising:
    an input bonding pad and an output bonding pad each having a respective length less than one-quarter of a target wavelength corresponding to a target operating frequency, a respective characteristic impedance less than a target source impedance, and a respective reactive impedance that is capacitive up to at least the target operating frequency;
    an input microstrip line and an output microstrip line each having a respective length less than one-quarter of the target wavelength, a respective characteristic impedance greater than the target source impedance, and a respective reactive impedance that is inductive up to at least the target operating frequency; and
    an electro-absorption modulator having a signal electrode with a length less than one-quarter of the target wavelength, a characteristic impedance less than the target source impedance, and an equivalent circuit of a shunt capacitor at the target operating frequency;
    wherein the input microstrip line is connected between the input bonding pad and the electro-absorption modulator, the output microstrip line is connected between the output bonding pad and the electro-absorption modulator, and the input bonding pad, the output bonding pad, the input microstrip line, the output microstrip line, and the electro-absorption modulator have an equivalent circuit of a distributed low-pass filter transmission line circuit having a characteristic impedance matching the target source impedance at the target operating frequency.

2. The device of claim 1, wherein the series inductances of the input and output microstrip lines, the shunt capacitances of the input bonding pad and the output bonding pad, and the shunt capacitance of the signal electrode are selected to match the distributed low-pass filter transmission line circuit to the target source impedance at the target operating frequency.

3. The device claim 1, further comprising a transmission line stub connected in parallel with the output bonding pad and having a length less than one-quarter of the target wavelength and a reactive impedance that is capacitive up to at least the target operating frequency, wherein the transmission line stub, the input bonding pad, the output bonding pad, the input microstrip line, the output microstrip line, and the electro-absorption modulator have an equivalent circuit of a distributed low-pass filter transmission line circuit having a characteristic impedance matching the target source impedance at the target operating frequency.

4. The device of claim 1, wherein the reactive impedances of the input microstrip line and the output microstrip line (24) compensate for the impedances of the input bonding pad (18), the output bonding pad (22), and the electro-absorption modulator (12) so that the transmission line circuit (10) matches the target source impedance near the target operating frequency.

5. The device of claim 1, wherein the signal electrode of the electro-absorption modulator has a distributed traveling wave structure comprising multiple spaced-apart signal electrode segments connected in series, with each pair of signal electrode segments being connected by a respective microstrip line.

6. The device of claim 5, wherein each signal electrode segment has a length less than one-quarter of the target wavelength, a characteristic impedance less than a target source impedance, and a reactive impedance that is capacitive up to at least the target operating frequency.

7. The device of claim 5, wherein each microstrip line connecting the signal electrode segments has a length less than one-quarter of the target wavelength, a characteristic impedance greater than a target source impedance, and a reactive impedance that is inductive up to at least the target operating frequency.

8. The device of claim 5, wherein the signal electrode segments are formed on respective electrically conducting regions of a layer electrically isolated from each other by electrically insulating regions of the layer.

9. The device of claim 1, wherein the target source impedance is 50 ohms.

10. The device of claim 1, wherein each microstrip line includes an electrically insulating layer disposed between electrically conducting layers.

11. The device of claim 1, wherein the signal electrode is formed on a ridge structure.

12. The device of claim 1, further comprising an input bonding wire connected between a signal source and the input bonding pad, and an output bonding wire connected between a termination load and the output bonding pad, wherein the signal source, the termination load, the input bonding wire, the output bonding wire, the input bonding pad, the output bonding pad, the input microstrip line, the output microstrip line, and the electro-absorption modulator form a distributed low-pass filter transmission line system that is impedance-matched up to at least the target operating frequency.

13. The device of claim 1, wherein the target operating frequency is a highest electrical signal frequency specified for a product incorporating the device.

* * * * *